United States Patent
Miyachi

(10) Patent No.: US 10,731,521 B2
(45) Date of Patent: Aug. 4, 2020

(54) VALVE OPENING AND CLOSING TIMING CONTROL APPARATUS

(71) Applicant: AISIN SEIKI KABUSHIKI KAISHA, Kariya-shi, Aichi-ken (JP)

(72) Inventor: Eiji Miyachi, Nishio (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 135 days.

(21) Appl. No.: 16/014,293

(22) Filed: Jun. 21, 2018

(65) Prior Publication Data
US 2018/0371964 A1    Dec. 27, 2018

(30) Foreign Application Priority Data

Jun. 23, 2017  (JP) ................................. 2017-123430

(51) Int. Cl.
| | |
|---|---|
| *F01L 1/34* | (2006.01) |
| *F01L 1/352* | (2006.01) |
| *F01L 1/047* | (2006.01) |
| *F16D 3/04* | (2006.01) |
| *F16H 35/00* | (2006.01) |
| *F16H 1/32* | (2006.01) |

(52) U.S. Cl.
CPC ............... *F01L 1/352* (2013.01); *F01L 1/047* (2013.01); *F16D 3/04* (2013.01); *F16H 35/008* (2013.01); *F01L 2250/02* (2013.01); *F01L 2250/04* (2013.01); *F01L 2810/02* (2013.01); *F01L 2820/032* (2013.01); *F16H 1/32* (2013.01)

(58) Field of Classification Search
CPC ..... F01L 1/352; F01L 1/047; F01L 2820/032; F01L 2250/02; F01L 2250/04; F01L 2810/02; F16H 1/32; F16H 35/008; F16D 3/04
See application file for complete search history.

(56) References Cited

U.S. PATENT DOCUMENTS 7,603,975 B2    10/2009    Sugiura et al.
2017/0138228 A1    5/2017    Miyachi et al.

FOREIGN PATENT DOCUMENTS

JP    2008-38886 A    2/2008
JP    2016-44627 A    4/2016

OTHER PUBLICATIONS

U.S. Appl. No. 16/349,485, filed May 13, 2019, Eiji Miyachi et al.

*Primary Examiner* — Zelalem Eshete
(74) *Attorney, Agent, or Firm* — Buchanan Ingersoll & Rooney PC

(57) ABSTRACT

A valve opening and closing timing control apparatus includes a driving-side rotation member, a driven-side rotation member, a phase adjustment mechanism configured as a differential type reduction gear mechanism where an inner gear rotates about a rotation axis while revolving around an eccentric axis which is disposed parallel to the rotation axis in a state where a drive shaft fitted in the inner gear is driven to rotate about the rotation axis, a biasing member provided at an outer periphery of the drive shaft and applying a biasing force to mesh an external teeth portion of the inner gear with an internal teeth portion of the ring gear, and a restriction portion provided at the drive shaft to restrict a displacement of the inner gear in a direction where the inner gear is separated from the ring gear against the biasing force of the biasing member.

3 Claims, 6 Drawing Sheets

VALVE OPENING AND CLOSING TIMING CONTROL APPARATUS

CROSS REFERENCE TO RELATED APPLICATIONS

This application is based on and claims priority under 35 U.S.C. § 119 to Japanese Patent Application 2017-123430, filed on Jun. 23, 2017, the entire content of which is incorporated herein by reference.

TECHNICAL FIELD

This disclosure generally relates to a valve opening and closing timing control apparatus.

BACKGROUND DISCUSSION

A known valve opening and closing timing control apparatus which specifies a relative rotation phase between a driving-side rotational member and a driven-side rotational member by a drive force of an electric actuator is disclosed, for example, in JP2008-038886A which is hereinafter referred to as Reference 1. Specifically, Reference 1 discloses a differential type reduction gear mechanism including a ring gear (an inner gear portion) arranged coaxially with a rotation axis, an inner gear (a planetary gear or a second gear member) arranged coaxially with an eccentric axis which is disposed in parallel to the rotation axis, and a drive shaft (a planetary career) internally fitted to the inner gear so that an external teeth portion of the inner gear is meshed with a part of an internal teeth portion of the ring gear.

The valve opening and closing timing control apparatus disclosed in Reference 1 further includes a biasing member (a spring member) at a position not matching or overlapping a position at which the external teeth portion of the inner gear is meshed with the internal teeth portion of the ring gear (i.e., not matching or overlapping an eccentric direction) in an outer periphery of the drive shaft. The biasing member applies a biasing force for meshing the external teeth portion of the inner gear with the internal teeth portion of the ring gear.

Further, in the valve opening and closing timing control apparatus disclosed in Reference 1, a recess portion (an accommodation portion) is provided at the outer periphery of the drive shaft so that a leaf spring constituting the spring member is fitted in the recess portion for exercising the biasing force.

According to the valve opening and closing timing control apparatus disclosed in Reference 1, the inner gear (the planetary gear or the second gear member) is supported at least at three portions including a portion at which an inner peripheral surface of a center bore of the inner gear and an elastic force application line intersect with each other, a portion at which the inner peripheral surface of the center bore of the inner gear and an outer peripheral surface of the drive shaft (the planetary career) make contact with each other, and a portion at which the inner gear and the ring gear (the inner gear portion) are meshed with each other.

With the aforementioned construction, even in a case where a cam fluctuation torque is transmitted to the valve opening and closing timing control apparatus, looseness of the inner gear is restrained so that generation of abnormal noise is inhibited. That is, according to the valve opening and closing timing control apparatus disclosed in Reference 1, the inner gear is supported at the three portions to stabilize the position or posture of the inner gear while a clearance at a meshed portion between the inner gear and the ring gear is also reduced to thereby restrain generation of abnormal noise and phase fluctuation.

At this time, in an assumed construction where the inner gear is arranged to be rotatable about the eccentric axis, the teeth portion of the inner gear and the teeth portion of the ring gear being meshed with each other in a state where a biasing force is applied in a direction where the teeth portions of the inner gear and the outer gear are meshed with each other, the aforementioned meshing state is maintained by the large biasing force. As a result, generation of abnormal noise is restrained and the phase fluctuation is also restrained.

Nevertheless, with the large biasing force, tooth surfaces of the inner gear and tooth surfaces of the ring gear make strong contact with each other to generate sliding resistance that may cause increase of rotation load. As a result, a response speed of the valve opening and closing timing control apparatus may be lowered.

A need thus exists for a valve opening and closing timing control apparatus which is not susceptible to the drawback mentioned above.

SUMMARY

According to an aspect of this disclosure, a valve opening and closing timing control apparatus includes a driving-side rotation member arranged to be rotatable about a rotation axis and rotating synchronously with a crankshaft of an internal combustion engine, a driven-side rotation member arranged to be rotatable about the rotation axis and rotating integrally with a camshaft for opening and closing a valve of the internal combustion engine in a state where the driven-side rotation member is rotatable relative to the driving-side rotation member, a phase adjustment mechanism specifying a relative rotation phase between the driving-side rotation member and the driven-side rotation member by a drive force of an electric actuator, the phase adjustment mechanism including a ring gear, an inner gear and a drive shaft, the ring gear being arranged coaxially with the rotation axis and including an internal teeth portion, the inner gear being arranged coaxially with an eccentric axis which is disposed parallel to the rotation axis and including an external teeth portion which is meshed with a part of the internal teeth portion of the ring gear, the drive shaft being fitted in the inner gear and being coaxial with the rotation axis, the phase adjustment mechanism being configured as a differential type reduction gear mechanism where the inner gear rotates about the rotation axis while revolving around the eccentric axis in a state where the drive shaft is driven to rotate about the rotation axis by a drive force of the electric actuator, a biasing member provided at an outer periphery of the drive shaft, the biasing member applying a biasing force to mesh the external teeth portion of the inner gear with the internal teeth portion of the ring gear, and a restriction portion provided at the drive shaft to restrict a displacement of the inner gear in a direction where the inner gear is separated from the ring gear against the biasing force of the biasing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
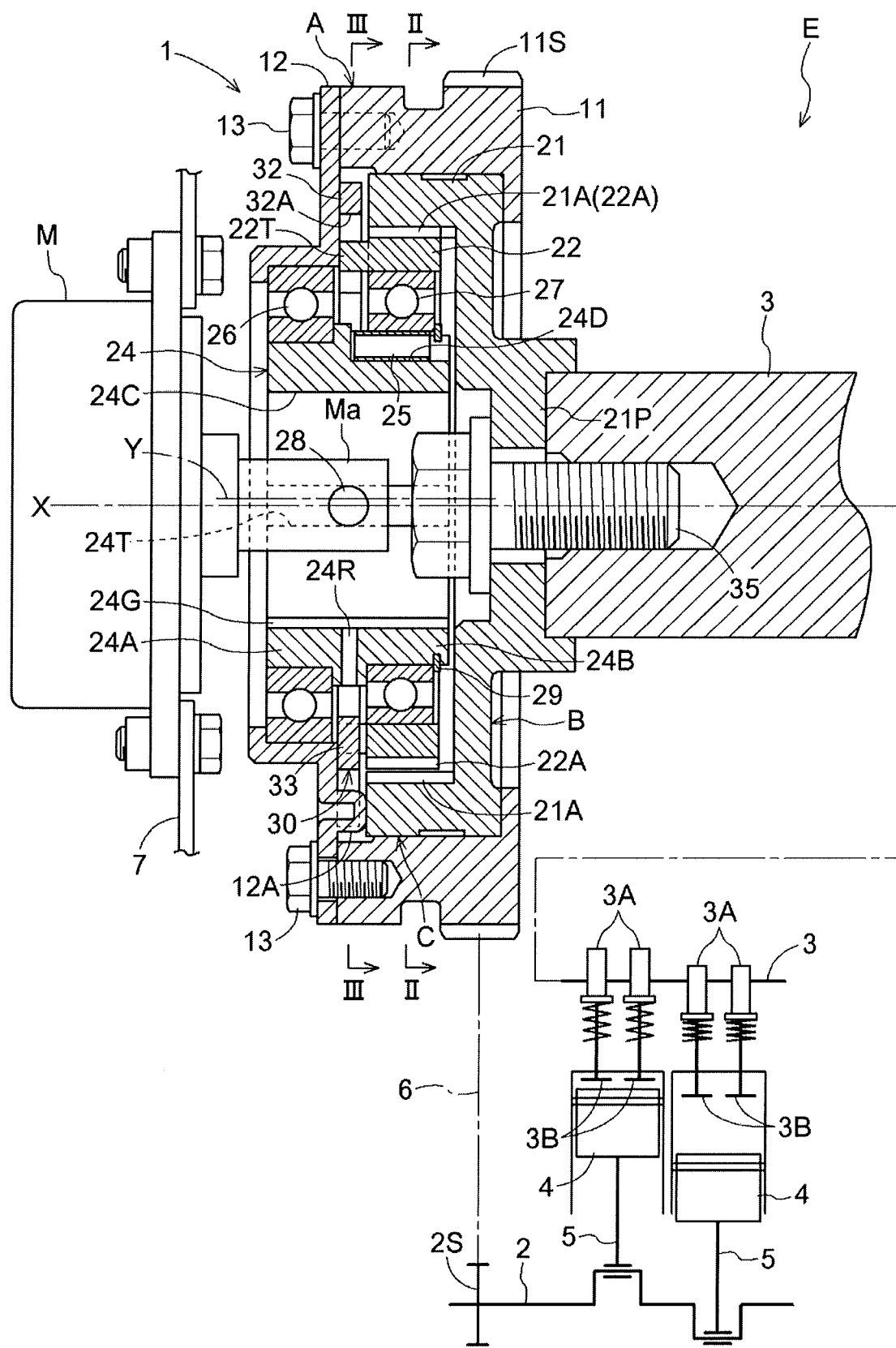
FIG. 1 is a cross-sectional view of a valve opening and closing timing control apparatus according to a first embodiment disclosed here.

A first embodiment disclosed here is explained with reference to the attached drawings. As illustrated in FIGS. 1 to 4, a valve opening and closing timing control apparatus 1 is configured by including a driving-side rotation member A which rotates synchronously with a crankshaft 2 of an engine E serving as an internal combustion engine, a driven-side rotation member B which rotates integrally with an intake camshaft 3, and a phase adjustment mechanism C which specifies a relative rotation phase between the driving-side rotation member A and the driven-side rotation member B by a drive force of a phase control motor M serving as an example of an electric actuator.

The engine E is configured as a four-cycle engine where pistons 4 are housed in respective cylinder bores formed at a cylinder block, the pistons 4 being connected to the crankshaft 2 by respective connecting rods 5. A timing belt 6, which may be alternately a timing chain, for example, is wound and disposed over an output pulley 2S of the crankshaft 2 of the engine E and a drive pulley 11S of the driving-side rotation member A.

With the aforementioned construction, the valve opening and closing timing control apparatus 1 entirely rotates about a rotation axis (rotation axis center) X in a case where the engine E is operated. The driven-side rotation member B is displaceable or movable relative to the driving-side rotation member A by driving of the phase adjustment mechanism C in the same direction as the rotation direction of the valve opening and closing timing control apparatus 1 or an opposite direction to the rotation direction.

In the valve opening and closing timing control apparatus 1, driving of the phase control motor M is controlled by a control unit such as an ECU, for example. Because of the aforementioned control, the phase adjustment mechanism C specifies the relative rotation phase between the driving-side rotation member A and the driven-side rotation member B, which realizes and achieves control of opening and closing timing of each intake valve 3B by a cam portion 3A of the intake camshaft 3.

The driving-side rotation member A includes a construction where an outer case 11 at which the drive pulley 11S is provided and a front plate 12 are tightened together by plural fastening bolts 13. The driven-side rotation member B and the phase adjustment mechanism C which is configured as a hypotrochoid type reduction gear serving as an example of a differential type reduction gear mechanism are housed in an inner space defied at the outer case 11.

The driven-side rotation member B is constituted by a ring gear 21 at which an internal teeth portion 21A including a number of internal teeth is provided. The phase adjustment mechanism C includes the ring gear 21, an inner gear 22 at which an external teeth portion 22A including a number of external teeth is provided, the external teeth portion 22A being meshed with the internal teeth portion 21A of the ring gear 21, a drive shaft 24 fitted in the inner gear 22, and a coupling member 30 serving as a linkage mechanism which causes the inner gear 22 to be linked to the driving-side rotation member A.

Figure 2:
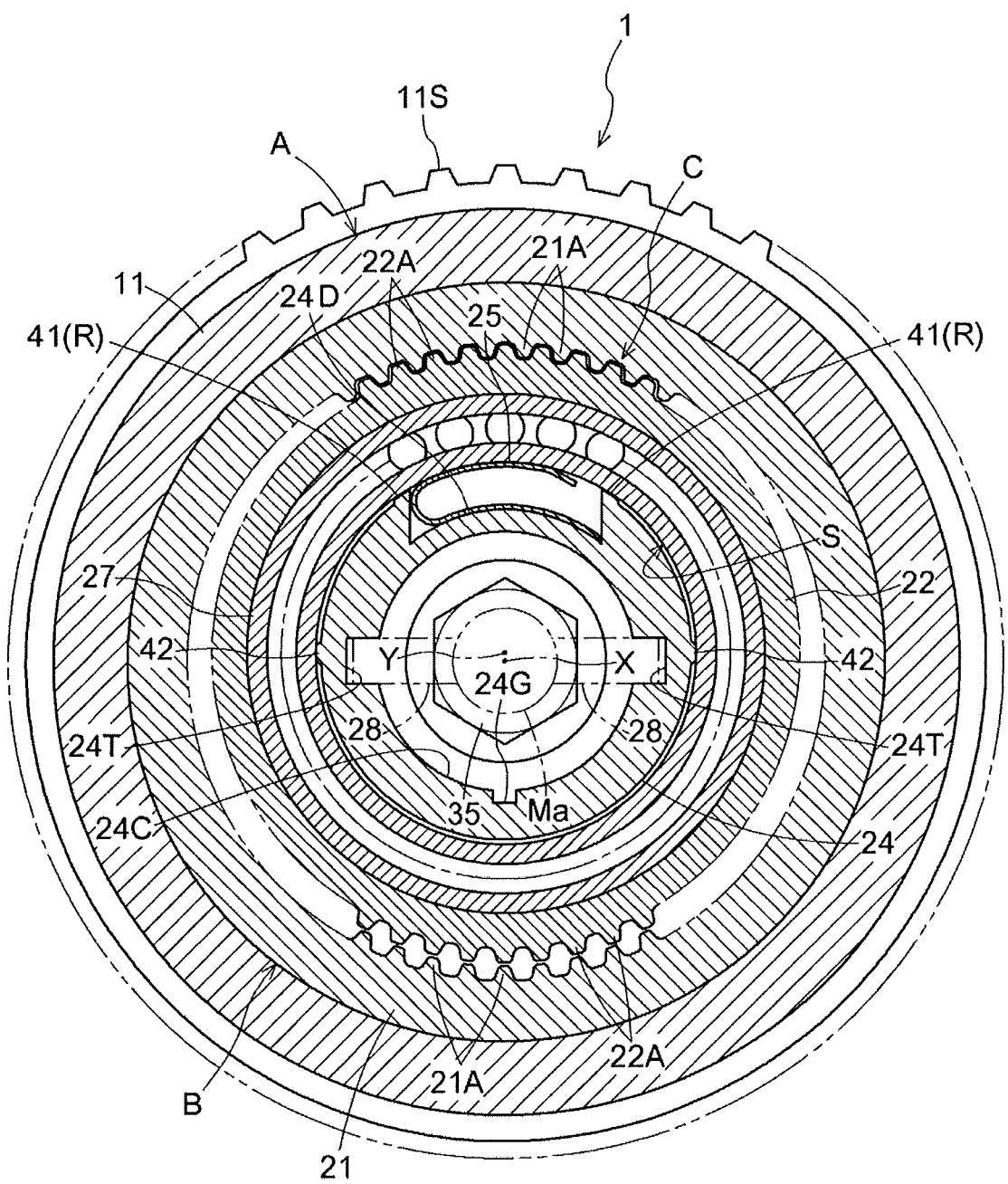
FIG. 2 is a cross-sectional view taken along a line II-II in FIG. 1.

As illustrated in FIG. 2, the ring gear 21 is arranged coaxially with the rotation axis X while the inner gear 22 is arranged coaxially with an eccentric axis (eccentric axis center) Y which is disposed in parallel to the rotation axis X. A part of the external teeth portion 22A of the inner gear 22 is meshed with a part of the internal teeth portion 21A of the ring gear 21. The number of teeth of the external teeth portion 22A of the inner gear 22 is less by one (one tooth) than the number of teeth of the internal teeth portion 21A of the ring gear 21.

As illustrated in FIGS. 1 to 4, the phase control motor M (electric motor) is supported at the engine E by a support frame 7 so that an output shaft Ma of the motor M is arranged coaxially with the rotation axis X.

The ring gear 21 includes a construction where a driven plate 21P which is arranged orthogonal to the rotation axis X is integrally provided with a ring-formed portion where the internal teeth portion 21A is provided. The ring gear 21 is connected to the intake camshaft 3 to be coaxial with the rotation axis X in a state where a connection bolt 35 is inserted to be positioned within a center bore portion of the driven plate 21P and is screwed on the intake camshaft 3.

Figure 5:
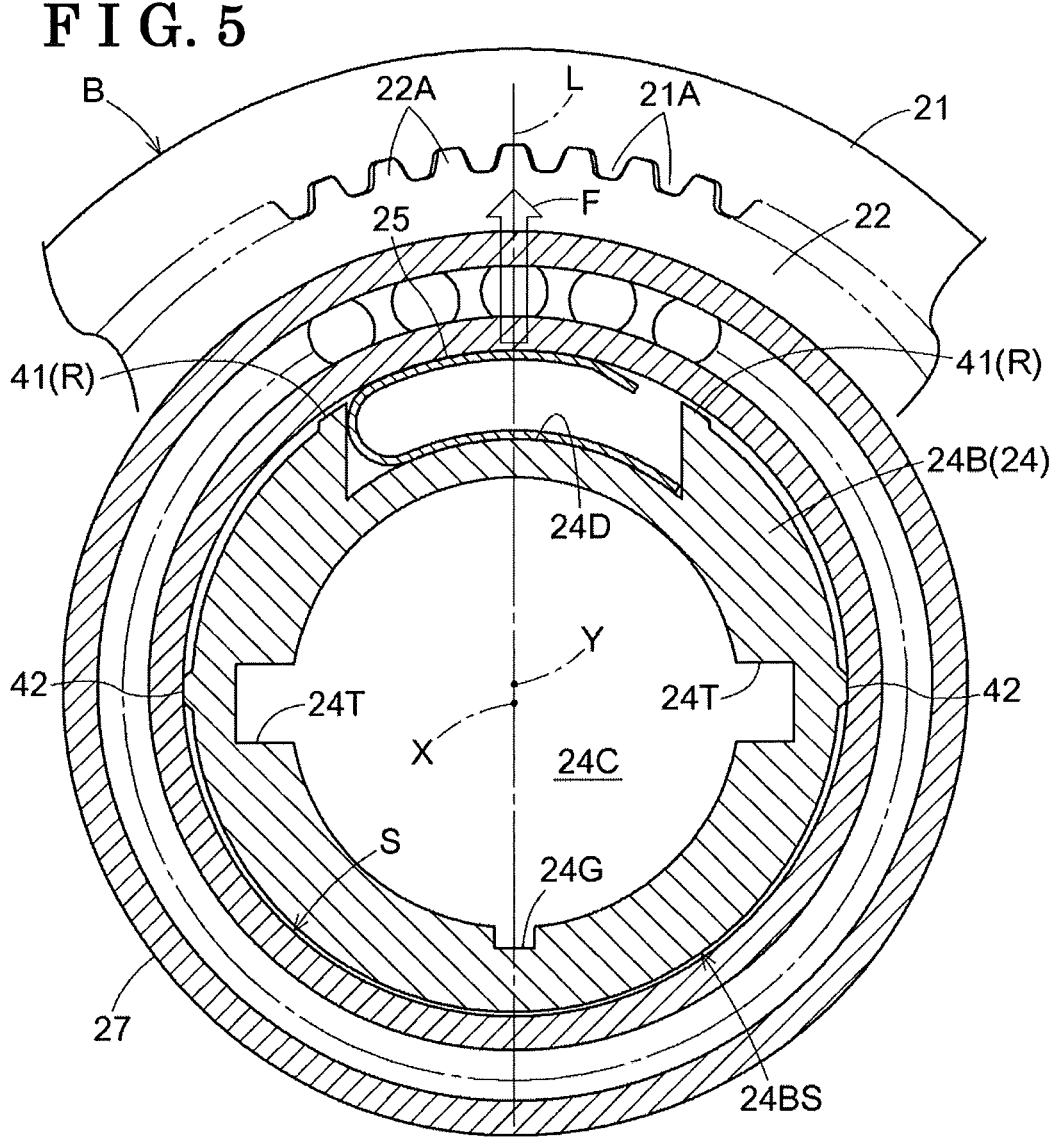
FIG. 5 is an enlarged cross-sectional view illustrating a relationship between a restriction portion and a spring.

The drive shaft 24 includes a first support portion 24A at a first end side (an outer end side) along the rotation axis X and a second support portion 24B at a second end side (an inner end side) along the rotation axis X. The first support portion 24A forms an outer peripheral surface with reference to the rotation axis X. The second support portion 24B forms an outer peripheral surface with reference to the eccentric axis Y. A single recess portion 24D is formed at an outer periphery of the second support portion 24B so that a spring 25 serving as a biasing member is fitted in the recess portion 24D. An imaginary straight line connecting the rotation axis X and the eccentric axis Y is defined as a deviation direction line L as illustrated in FIG. 5. A biasing direction F in which the biasing force is applied from the spring 25 to the inner gear 22 (specifically, to an inner race of a second bearing 27 positioned at a radially inner side) is brought to match the deviation direction line L.

The spring 25 is formed by a U-shaped spring plate so as to include a pair of plate-formed portions which are positioned substantially in parallel to each other. One of the plate-formed portions is in contact with a bottom surface of the recess portion 24D while the other of the plate-formed portions is in contact with an inner peripheral surface S of the second bearing 27 serving as a bearing.

The drive shaft 24 includes a bore portion 24C defined with reference to the rotation axis X. A pair of engagement grooves 24T is provided at a periphery of the bore portion 24C while extending in parallel to the rotation axis X so that an engagement member 28 of the output shaft Ma of the phase control motor M engages with the pair of engagement grooves 24T.

In addition, a single lubrication groove 24G extending parallel to the rotation axis X is provided at the periphery of the bore portion 24C. A single lubrication flow passage 24R penetrating through from the lubrication groove 24G to an outer surface of the drive shaft 24 and a pair of lubrication flow passages 24R penetrating through from the pair of engagement grooves 24T to the outer surface of the drive shaft 24 are also provided at the periphery of the bore portion 24C.

As illustrated in FIG. 1, a first bearing 26 is arranged between an opening at a center of the front plate 12 and the first support portion 24A of the drive shaft 24 so that the drive shaft 24 is supported to be rotatable about the rotation axis X relative to the driving-side rotation member A.

As illustrated in FIG. 2, the second bearing 27 formed by a ball bearing is arranged between an inner periphery of the inner gear 22 and the second support portion 24B of the drive shaft 24 so that the inner gear 22 is supported to be relatively rotatable about the eccentric axis Y. The biasing force of the spring 25 is configured to be applied to the inner peripheral surface S of the second bearing 27. In addition, a C-ring 29 (see FIGS. 1 and 4) serving as a retaining ring is provided to inhibit the spring 25 from being removed or disengaged from the second support portion 24B of the drive shaft 24.

Accordingly, the inner gear 22 is supported to be rotatable about the eccentric axis Y while a part of the external teeth portion 22A is meshed with a part of the internal teeth portion 21A of the ring gear 21 as illustrated in FIG. 2, the meshing being maintained and held by the biasing force of the spring 25. An operation for specifying the relative rotation phase between the driving-side rotation member A and the driven-side rotation member B in the valve opening and closing timing control apparatus 1 is explained later.

Figure 3:
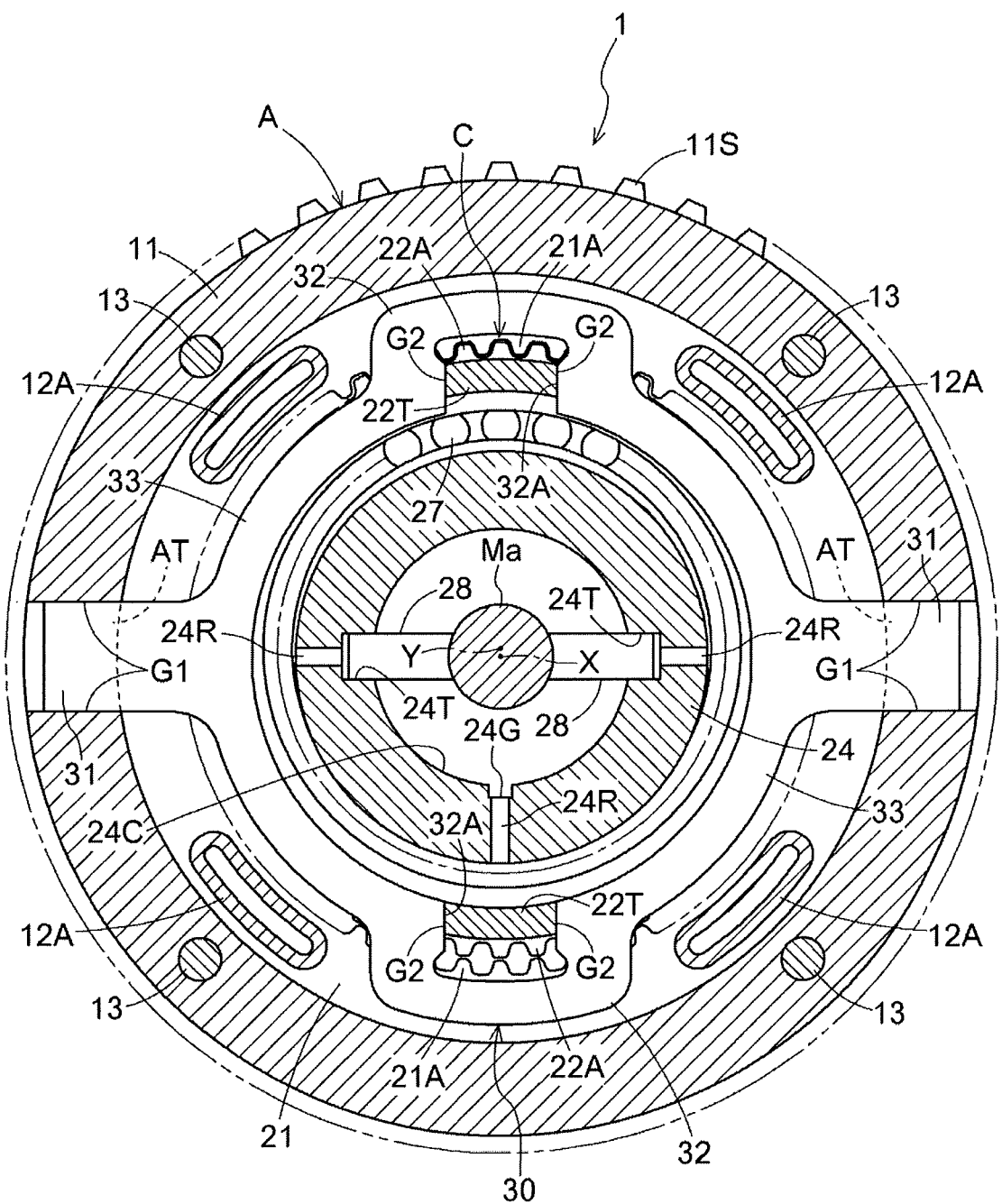
FIG. 3 is a cross-sectional view taken along a line in FIG. 1.
Figure 4:
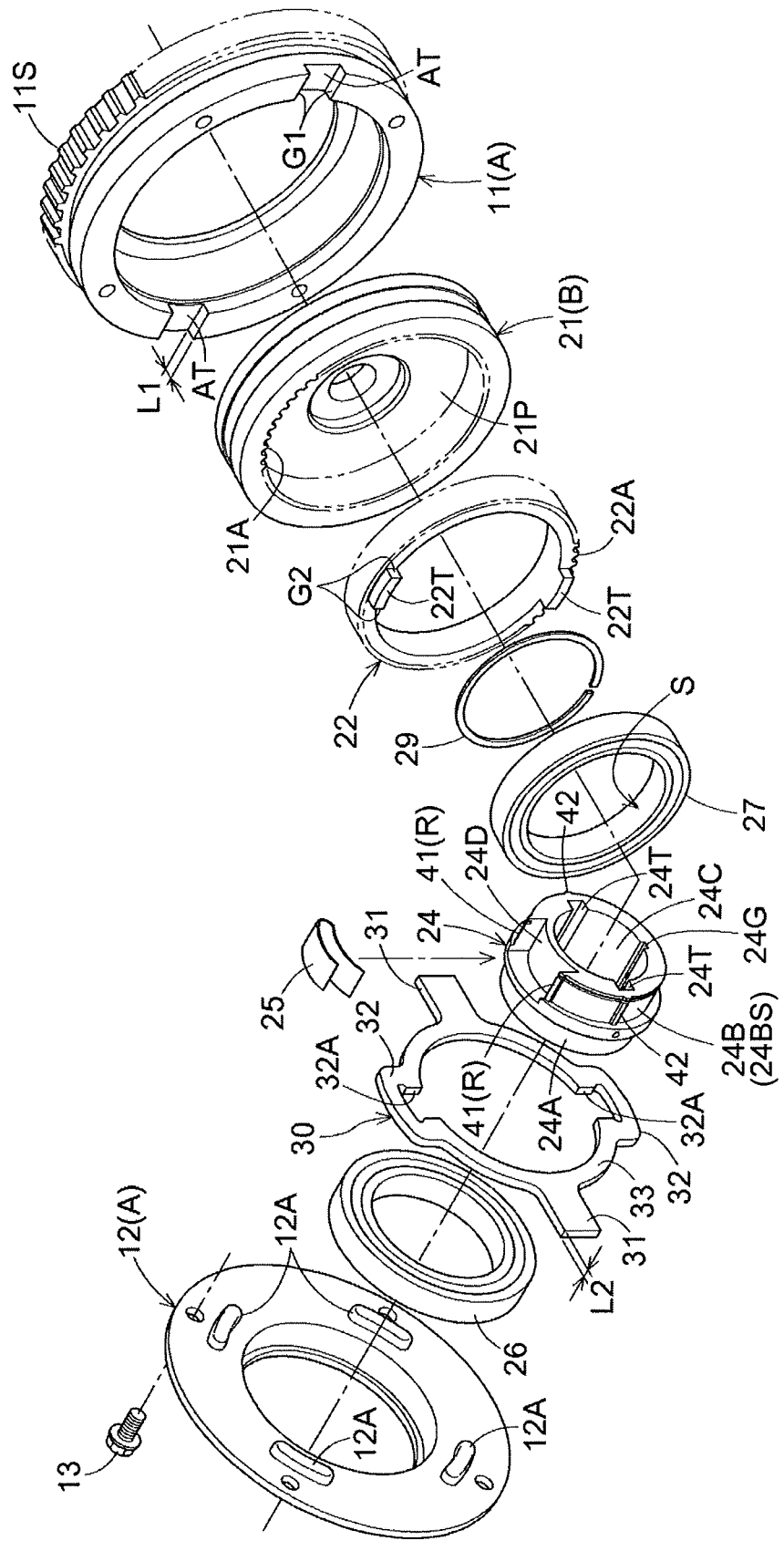
FIG. 4 is an exploded perspective view of the valve opening and closing timing control apparatus according to the first embodiment.

The coupling member 30 constituting the linkage mechanism is produced or manufactured by press working on a plate member, for example, as illustrated in FIGS. 3 and 4. The coupling member 30 integrally includes a pair of first engagement arms 31 protruding outward with reference to the rotation axis X, a pair of second engagement arms 32 protruding outward with reference to the rotation axis X in a direction orthogonal to a direction where the first engagement arms 31 protrude, and a ring portion 33 connecting the pair of first engagement arms 31 and the pair of second engagement arms 32 with one another. Engagement recess portions 32A are formed at the respective second engagement arms 32 to open towards a center of the coupling member 30 (i.e., towards the rotation axis X).

The outer case 11 constituting the driving-side rotation member A includes a pair of penetration grooves AT which extends in a radial direction with reference to the rotation axis X from the inner space of the outer case 11 to an outer space thereof. A pair of first guide surfaces G1 is provided at each of the penetration grooves AT by extending in a direction where the penetration groove AT extends, the pair of first guide surfaces G1 extending in parallel to each other. A pair of linkage portions 22T is formed in a protruding manner at an end surface of the inner gear 22 so as to be positioned facing each other relative to the eccentric axis Y. A pair of second guide surfaces G2 is provided at each of the linkage portions 22T by extending in the radial direction with reference to the rotation axis X.

With the aforementioned construction, the first engagement arms 31 of the coupling member 30 engage with the respective penetration grooves AT and the engagement recess portions 32A of the second engagement arms 32 of the coupling member 30 engage with the respective linkage portions 22T so that the coupling member 30 may function as an Oldham coupling.

In addition, a pair of linear portions of each of the first engagement arms 31 makes contact with the pair of first guide surfaces G1 of each of the penetration grooves AT and a pair of linear portions of each of the engagement recess portions 32A of the second engagement arm 32 makes contact with the pair of second guide surfaces G2 of each of the linkage portions 22T.

As illustrated in FIG. 4, a groove depth L1 of the penetration groove AT is specified to be sufficiently greater than a thickness L2 of the first engagement arm 31. Thus, while a front surface of the first engagement arm 31 and the front plate 12 are brought to make contact with each other, a clearance is defined between a rear surface of the first engagement arm 31 and a bottom portion of the penetration groove AT.

Further, plural protruding portions 12A are formed in a protruding manner at an inner surface of the front plate 12. The plural protruding portions 12A make contact with an end surface of the ring gear 21 so as to position the ring gear 21 in the direction along the rotation axis X.

The valve opening and closing timing control apparatus 1 includes the control unit for controlling the phase control motor M. In order to maintain the relative rotation phase between the driving-side rotation member A and the driven-side rotation member B, the drive shaft 24 is driven to rotate at a speed substantially equal to a rotation speed of the intake camshaft 3.

On the other hand, in order to specify the relative rotation phase between the driving-side rotation member A and the driven-side rotation member B to a target phase, the output shaft Ma of the phase control motor M is driven to rotate at a faster speed or a slower speed than the rotation speed of the intake camshaft 3.

When the drive shaft 24 rotates with the drive force of the phase control motor M in a state where the engine E is stopped, the second support portion 24B rotates about the rotation axis X, which causes the inner gear 22 to start revolving around the rotation axis X. While the inner gear 22 is revolving around the rotation axis X, a position at which the external teeth portion 22A of the inner gear 22 and the internal teeth portion 21A of the ring gear 21 are meshed with each other is displaced along an inner periphery of the ring gear 21. As a result, the inner gear 22 receives a force for bringing the inner gear 22 to rotate about the eccentric axis Y.

That is, in a case where the inner gear 22 revolves by one around the rotation axis X, a rotation force for causing the inner gear 22 to rotate by an angle corresponding to a difference between the number of teeth of the internal teeth portion 21A of the ring gear 21 and the number of teeth of the external teeth portion 22A of the inner gear 22 (in the embodiment, an angle corresponding to one tooth) is generated and exercised.

As mentioned above, the coupling member 30 is configured to restrict the rotation of the inner gear 22 relative to the outer case 11 and therefore the inner gear 22 is inhibited from rotating relative to the outer case 11. Thus, with the rotation force applied to the inner gear 22, the ring gear 21 rotates relative to the outer case 11. Because the ring gear 21 is connected to the intake camshaft 3, the rotation of the ring gear 21 relative to the outer case 11 achieves adjustment of rotation phase of the intake camshaft 3.

Specifically, in a case where the inner gear 22 revolves by one around the rotation axis X, the intake camshaft 3 rotates relative to the outer case 11 by the angle corresponding to the difference in the number of teeth between the internal teeth portion 21A of the ring gear 21 and the external teeth portion 22A of the inner gear 22. As a result, the rotation phase of the intake camshaft 3 is adjustable with a large reduction ratio.

The engine E includes a belt case which houses the timing belt 6 for driving the intake camshaft 3 and an exhaust camshaft. The valve opening and closing timing control apparatus 1 is arranged within the belt case. Because of the aforementioned construction and positional relationship, a part of lubricant supplied to the camshaft flows from the opening at the center of the front plate 12 to the bore portion 24C of the drive shaft 24 and is supplied to each portion at the inner space of the outer case 11 via the lubrication flow passages 24R, for example, so as to smoothly operate the phase adjustment mechanism C. The lubricant which lubricates in the aforementioned manner is discharged to the outside from the penetration grooves AT provided at the driving-side rotation member A.

As illustrated in FIG. 5, restriction portions R are provided at the outer periphery of the drive shaft 24 for restricting the inner gear 22 from moving or displacing in a direction away from the ring gear 21 against the biasing force of the spring 25 (biasing member).

The restriction portions R are constituted by a pair of restriction projections 41 provided integrally at the second support portion 24B, the restriction projections 41 being formed by circumferentially opposed outer edge portions of the recess portion 24D protruding outward (i.e., in a radially outward).

As illustrated in FIG. 5, in a state where the external teeth portion 22A of the inner gear 22 are meshed with the internal teeth portion 21A of the ring gear 21, a projection end of each of the restriction projections 41 of the restriction portion R is configured away from the inner peripheral surface S of the second bearing 27 (specifically, away from the inner peripheral surface of the inner race of the second bearing 27). With the aforementioned construction, a clearance (a gap) is defined between the projection end of the restriction projection 41 and the inner peripheral surface S of the second bearing 27. In a case where the inner gear 22 is displaced in the direction away from the ring gear 21, the projection end of each of the restriction projections 41 makes contact with the inner peripheral surface S of the second bearing 27 (i.e., makes contact with the inner peripheral surface of the inner race of the second bearing 27) to thereby restrict the displacement of the inner gear 22.

Figure 6:
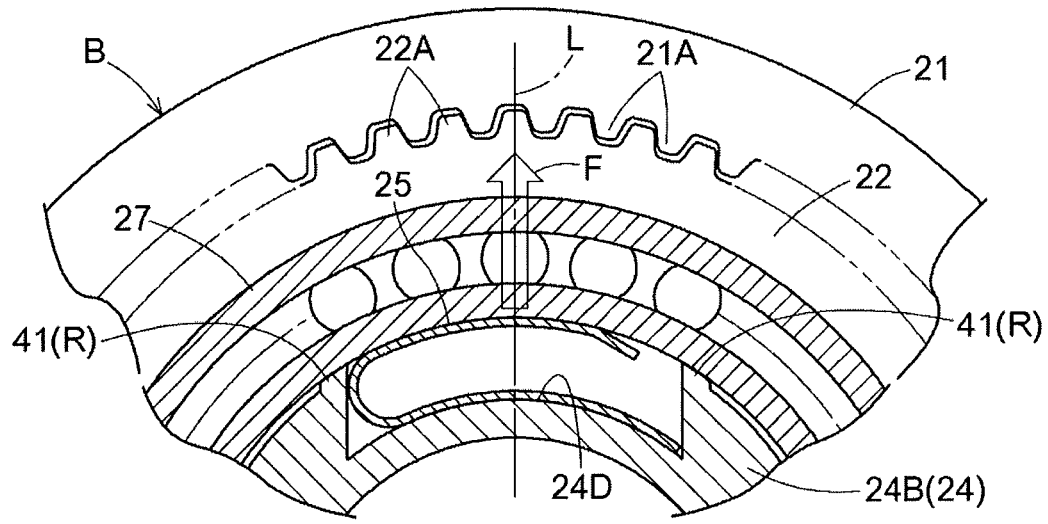
FIG. 6 is an enlarged cross-sectional view illustrating a restricted state obtained by the restriction portion.

That is, in a case where a cam fluctuation torque greater than a set value is applied to the valve opening and closing timing control apparatus 1, the inner gear 22 is displaced, against the biasing force of the spring 25, in the direction where the external teeth portion 22A separates from the internal teeth portion 21A of the ring gear 21. In addition, as illustrated in FIG. 6, the pair of restriction projections 41 of the restriction portions R make contact with the inner peripheral surface S of the second bearing 27 to thereby restrict the displacement of the inner gear 22 (i.e., a restricted state obtained by the restriction portions R).

As mentioned above, because the biasing direction F of the spring 25 matches the deviation direction line L, the restriction projections 41 of the restriction portions R restrict the displacement of the inner gear 22 in an opposite direction to the biasing direction F. In addition, the clearance between the projection end of each of the restriction projections 41 and the inner peripheral surface S of the second bearing 27 is specified to be equal to or smaller than a clearance defined between the drive shaft 24 and the inner surface S of the second bearing 27 in a state where tolerance accumulation obtained by accumulating dimensional tolerances of the ring gear 21, the inner gear 22 and the second bearing 27 in the radial direction is specified to be an upper limit value. That is, as long as the valve opening and closing timing control apparatus 1 is configured to include the ring gear 21, the inner gear 22, the second bearing 27 and the drive shaft 24 with dimensions within each tolerance range, the clearance is securely defined and formed between the projection end of each of the restriction projections 41 and the inner peripheral surface S of the second bearing 27.

The second support portion 24B of the drive shaft 24 includes and forms an outer peripheral surface 24BS (which is an example of an eccentric surface) having a circular form with reference to the eccentric axis Y. An outer diameter of the outer peripheral surface 24BS is specified slightly smaller than an inner diameter of the second bearing 27. A pair of guide projections 42 is provided at a portion in the outer peripheral surface 24BS, the portion including a largest diameter in a direction orthogonal to the deviation direction line L. The guide projections 42 protrude outward to make light contact with the inner peripheral surface S of the second bearing 27. A clearance between the outer peripheral surface 24BS and the inner peripheral surface S is actually small but is exaggeratingly illustrated in the drawings.

With the aforementioned construction, even in a state where the external teeth portion 22A of the inner gear 22 is meshed with the internal teeth portion 21A of the ring gear 21, a clearance is formed between a portion (surface) in the outer peripheral surface 24BS positioned radially opposite to the recess portion 24D and the inner peripheral surface S of the second bearing 27. Accordingly, the external teeth portion 22A is meshed with the internal teeth portion 21A in a state where the inner peripheral surface S of the second bearing 27 is inhibited from making contact with the outer peripheral surface 24BS of the second support portion 24B.

In addition, because the pair of guide projections 42 lightly makes contact with the inner peripheral surface S of the second bearing 27, the second bearing 27 is maintained and held at an appropriate position based on the drive shaft 24.

In the valve opening and closing timing control apparatus 1, a bush functioning as a sliding bearing is usable for each of the first bearing 26 and the second bearing 27. In addition, without the second bearing 27, a construction where the ring gear 21 is directly supported at the second support portion 24B of the drive shaft 24 may be employed.

In a case where the cam fluctuation torque is applied to the valve opening and closing timing control apparatus 1 during the operation of the engine E, a force for moving or displacing the external teeth portion 22A of the inner gear 22 in a direction where the external teeth portion 22A is separated from the internal teeth portion 21A is generated and exercised. In order to restrain the aforementioned displacement (separation), it is considerable to increase the biasing force of the spring 25. Nevertheless, with the increased biasing force, a tooth surface of each tooth of the internal teeth portion 21A and a tooth surface of each tooth of the external teeth portion 22A make strong contact (press contact) with each other to thereby increase sliding resistance between the tooth surfaces. Therefore, not only a rotation load of the valve opening and closing timing control apparatus 1 increases but also a response speed thereof may be deteriorated (i.e., a response speed may increase).

In order to solve the aforementioned drawbacks, it is considerable to decrease the biasing force of the spring 25. Nevertheless, only the decrease of the biasing force may cause a large separation between the internal teeth portion 21A of the ring gear 21 and the external teeth portion 22A of the inner gear 22 when the cam fluctuation torque is applied. An abnormal noise may be generated by repetition of contact between the tooth surfaces of the external teeth portion 22A and the internal teeth portion 21A in the separation state thereof, which may lead to phase fluctuation of the valve opening and closing timing control apparatus 1.

Accordingly, the biasing force of the spring 25 is specified to a value which allows the displacement of the external teeth portion 22A from the internal teeth portion 21A in the direction where the external teeth portion 22A separates from the internal teeth portion 21A only when the cam fluctuation torque exceeding the set value is applied to the valve opening and closing timing control apparatus 1. The displacement of the inner gear 22 is configured to be restricted by the pair of restriction projections 41 accordingly.

With the aforementioned construction, at a time when the cam fluctuation torque is not applied, the external teeth portion 22A is meshed with the internal teeth portion 21A by the biasing force of the spring 25 as illustrated in FIG. 5. Thus, generation of abnormal noise or phase fluctuation does not occur. Specifically, because the tooth surface of each tooth of the internal teeth portion 21A and the tooth surface of each tooth of the external teeth portion 22A make light contact with each other, the rotation load of the ring gear 21 and the inner gear 22 is reduced, which may maintain high responsiveness of the valve opening and closing timing control apparatus 1 and prompt setting of the relative rotation phase thereof.

In addition, because an amount of elastic deformation of the spring 25 is restrained, fatigue of the spring 25 is restrained so that durability thereof may increase.

Further, in a case where the cam fluctuation torque exceeding the set value is applied, the inner gear 22 is displaced in the direction where the external teeth portion 22A separates from the internal teeth portion 21A as illustrated in FIG. 6. Nevertheless, at the time of displacement of the inner gear 22, the pair of restriction projections 41 of each of the restriction portions R makes contact with the inner peripheral surface S of the second bearing 27, which restricts the displacement of the inner gear 22. As a result, the external teeth portion 22A is inhibited from largely separating from the internal teeth portion 21A and the abnormal sound is inhibited from being generated.

As mentioned above, the outer diameter of the outer peripheral surface 24BS of the second support portion 24B of the drive shaft 24 is specified slightly smaller than the inner diameter of the second bearing 27. Thus, as compared to a case where the outer peripheral surface 24BS of the second support portion 24B is tightly and closely fitted to the inner peripheral surface S of the second bearing 27, for example, strict accuracy control of the drive shaft 24 is not necessary, which may simplify the production of the drive shaft 24. In addition, the clearance is formed between the portion (surface) in the outer peripheral surface 24BS positioned radially opposite to the recess portion 24D and the inner peripheral surface S of the second bearing 27. Thus, in a state where the external teeth portion 22A is meshed with the internal teeth portion 21A, such meshing state is securely maintained without the contact of the inner peripheral surface S of the second bearing 27 with the outer peripheral surface 24BS of the second support portion 24B.

A second embodiment including a different construction from the aforementioned construction of the first embodiment is explained below. Components of the second embodiment including substantially the same functions as the first embodiment bear the same reference numerals as the first embodiment.

Figure 7:
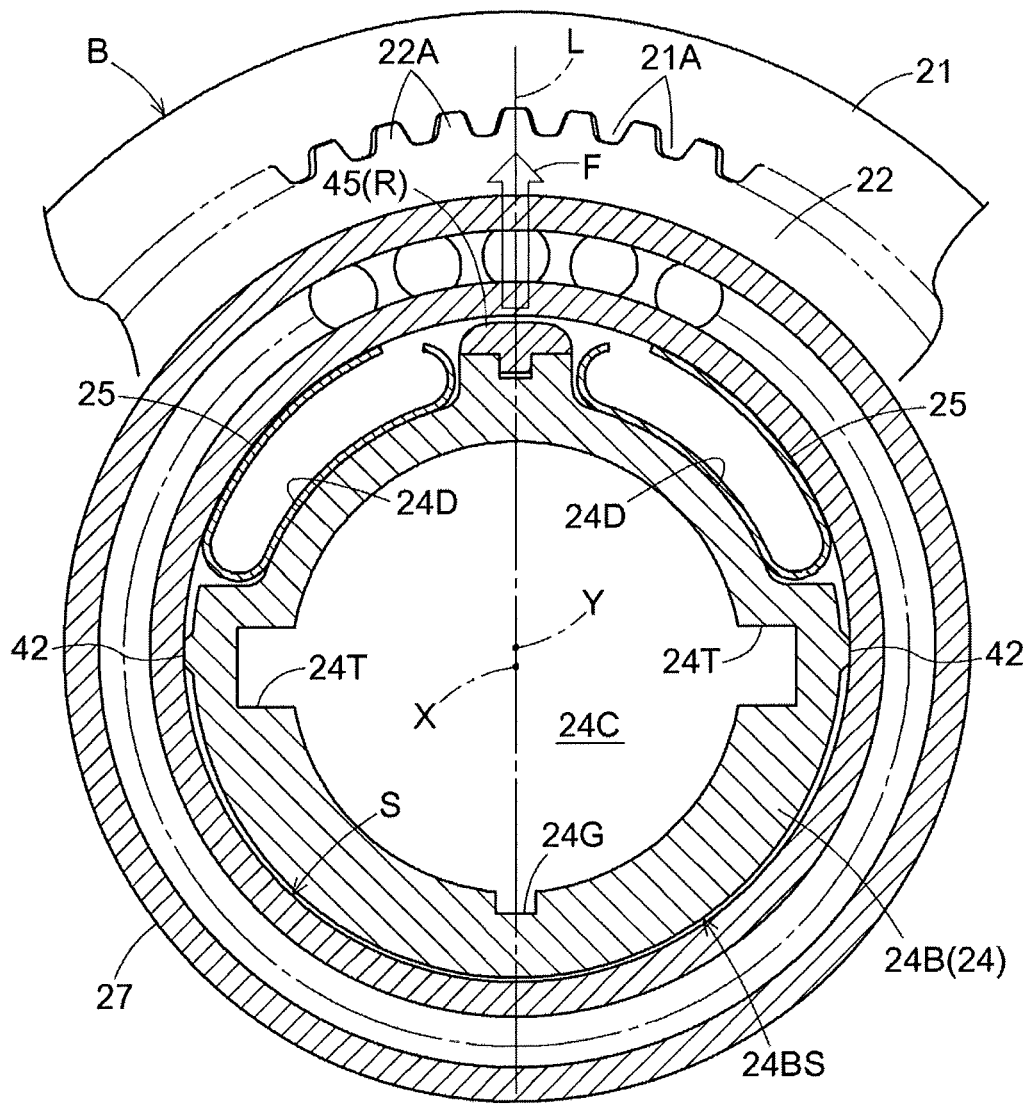
FIG. 7 is an enlarged cross-sectional view illustrating a relationship between the restriction portion and the spring according to a second embodiment disclosed here.
Figure 8:
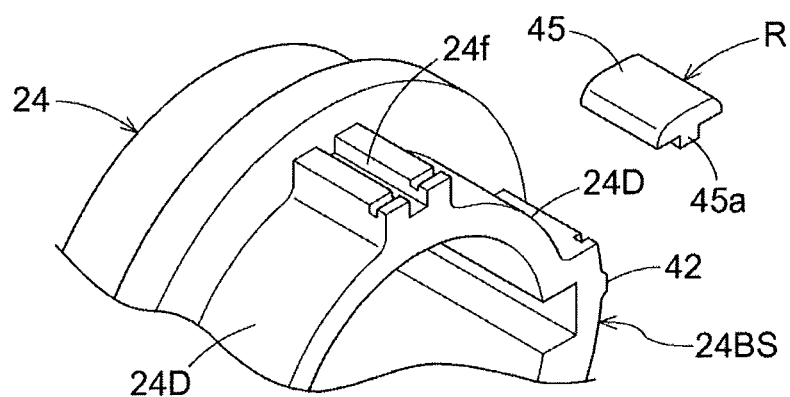
FIG. 8 is a perspective view illustrating a restriction piece according to the second embodiment.

As illustrated in FIGS. 7 and 8, two recess portions 24D are provided at the outer periphery of the second support portion 24B of the drive shaft 24 so as to be positioned facing each other relative to the deviation direction line L. The restriction portion R is provided at an intermediate position between the two recess portions 24D. The two springs 25 each of which serves as the biasing member are fitted in the respective recess portions 24D. The restriction portion R is constituted by a restriction piece 45 serving as a restriction member which is positioned overlapping the deviation direction line L as viewed in a direction illustrated in FIG. 7.

In addition, the restriction piece 45 at the restriction portion R includes a fitting portion 45a while the drive shaft 24 includes a fitting groove portion 24f to which the fitting portion 45a is fitted. The restriction piece 45 is provided for the drive shaft 24 so that the fitting portion 45a is fitted to the fitting groove portion 24f. In a construction where the restriction portion R is integrally provided at the drive shaft 24, a clearance between the protruding surface of the restriction portion R and the inner peripheral surface S of the second bearing 27 may vary depending on manufacturing accuracy and position accuracy of the drive shaft 24, for example.

Therefore, plural restriction pieces including different projection amounts from one another are prepared, for example, so that one of the plural restriction pieces 45 with which an appropriate clearance is obtainable may be used. As a result, even when the position of the second support portion 24B of the drive shaft 24 varies or differs to some extent, the clearance between the protruding surface of the restriction portion R and the inner peripheral surface S of the second bearing 27 may be appropriately specified.

In the second embodiment, the pair of springs 25 is provided. Alternatively, in the same way as the first embodiment, the single spring 25 may be provided in a state where the restriction portion R is obtained by the restriction piece 45 provided at least at one of the recess portions 24D.

In the first embodiment, the pair of guide projections 42 protrudes outward from the outer peripheral surface 24BS of the second support portion 24B of the drive shaft 24. Alternatively, a part of a cross-section of the second support portion 24B may be formed in an oval shape or an elliptical shape so that a long axis thereof corresponds to a direction in which a largest diameter is obtained in the outer peripheral surface 24BS orthogonal to the deviation direction line L.

Because the part of the second support portion 24B is formed in the oval or elliptical shape, an outer surface of the oval or ellipse in a direction along the long axis thereof makes light contact with the inner peripheral surface S of the second bearing 27 and a clearance is formed between a portion (surface) in the outer peripheral surface 24BS positioned radially opposite to the recess portion 24D and the inner peripheral surface S of the second bearing 27. Consequently, the external teeth portion 22A of the inner gear 22 may be stably meshed with the internal teeth portion 21A of the ring gear 21.

Specifically, in a case where the outer peripheral surface 24BS of the second support portion 24B is formed in a non-circular form and a clearance is formed between the outer peripheral surface 24BS and the inner peripheral surface S of the second bearing 27, high accuracy of the second support portion 24B is not necessary, which may lead to an easy manufacture of the valve opening and closing timing control apparatus 1.

According to the aforementioned embodiments, the valve opening and closing timing control apparatus 1 includes the driving-side rotation member A arranged to be rotatable about the rotation axis X and rotating synchronously with the crankshaft 2 of the engine E, the driven-side rotation member B arranged to be rotatable about the rotation axis X and rotating integrally with the camshaft 3 for opening and closing the valve 3B of the engine E in a state where the driven-side rotation member B is rotatable relative to the driving-side rotation member A, the phase adjustment mechanism C specifying the relative rotation phase between the driving-side rotation member A and the driven-side rotation member B by a drive force of the phase control motor M, the phase adjustment mechanism C including the ring gear 21, the inner gear 22 and the drive shaft 24, the ring gear 21 being arranged coaxially with the rotation axis X and including the internal teeth portion 21A, the inner gear 22 being arranged coaxially with the eccentric axis Y which is disposed parallel to the rotation axis X and including the external teeth portion 22A which is meshed with a part of the internal teeth portion 21A of the ring gear 21, the drive shaft 24 being fitted in the inner gear 22 and being coaxial with the rotation axis X, the phase adjustment mechanism C being configured as a differential type reduction gear mechanism where the inner gear 22 rotates about the rotation axis X while revolving around the eccentric axis Y in a state where the drive shaft 24 is driven to rotate about the rotation axis X by a drive force of the phase control motor M, the biasing member 25 provided at the outer periphery of the drive shaft 24, the biasing member 25 applying a biasing force to mesh the external teeth portion 22A of the inner gear 22 with the internal teeth portion 21A of the ring gear 21, and the restriction portion R provided at the drive shaft 24 to restrict a displacement of the inner gear 22 in a direction where the inner gear 22 is separated from the ring gear 21 against the biasing force of the biasing member 25.

Accordingly, in the construction where the biasing member 25 with a small biasing force (small spring constant) is employed, for example, a displacement of the external teeth portion 22A of the inner gear 22 from the internal teeth portion 21A of the ring gear 21 is restricted by the restriction portion R in a case where the external teeth portion 22A is displaced in a direction away from the internal teeth portion 21A with an application of a cam fluctuation torque. Thus, the inner gear 22 is inhibited from being displaced beyond a restriction limit of the restriction portion R. The abnormal noise is restrained from being generated at the teeth portions 21A and 22A and phase fluctuation is also restrained. In addition, in a state where the cam fluctuation torque decreases, the external teeth portion 22A of the inner gear 22 is appropriately meshed with the internal teeth portion 21A of the ring gear 21 by the biasing force of the biasing member 25.

In addition, without employing the biasing member 25 with a large biasing force (large spring constant), the external teeth portion 22A and the internal teeth portion 21A are restrained from being greatly separated from each other. An increase of rotation load caused by sliding resistance between a tooth surface of the inner gear 22 and a tooth surface of the ring gear 21 is restrained and deterioration of response speed of the valve opening and closing timing control apparatus 1 is inhibited. Accordingly, without increase of biasing force of the biasing member 25, the generation of abnormal noise at the teeth portions 21A and 22A is restrained and phase fluctuation is restrained. The rotation load is reduced and the response speed is secured. Because an elastic amount of the biasing member 25 decreases, durability of the biasing member 25 may increase.

According to the aforementioned embodiments, the drive shaft 24 includes the outer peripheral surface (eccentric surface) 24BS which is defined with reference to the eccentric axis Y and at which the recess portion 24D is provided, the recess portion 24D to which the spring 25 serving as the biasing member is fitted. The restriction portion R is constituted by at least one of opposed outer edge portions of the recess portion 24D in a circumferential direction of the outer peripheral surface 24BS, the at least one of opposed outer edge portions protruding outward in a radial direction.

Because the restriction portion R is obtained by the outer edge portion of the recess portion 24D at the drive shaft 24, the outer edge portion which protrudes in the radial direction and in which the spring (biasing member) 25 is fitted, the displacement of the inner gear 22 may be received at an appropriate position.

According to the aforementioned embodiments, the inner gear 22 is supported at the outer peripheral surface 24BS via the bearing 27 including the inner peripheral surface S to which the biasing force is applied by the biasing member 25, the restriction portion R being configured to make contact with the inner peripheral surface S of the bearing 27 to restrict the displacement of the inner gear 22.

Accordingly, even in the construction where the inner gear 22 is rotatably supported at the outer peripheral surface 24BS via the bearing 27 such as a ball bearing, for example, the biasing force of the biasing member 25 is applied to the inner gear 22, of which displacement is restricted by the restriction portion R in a case where the inner gear 22 is displaced in the direction away from the ring gear 21.

According to the aforementioned second embodiment, the restriction portion R is constituted by the restriction member 45 supported at the outer periphery of the drive shaft 24.

The restriction portion R is constituted by the restriction member 25 supported at the outer periphery of the drive shaft 24. Thus, plural restriction members including different projection amounts from one another are prepared, for example, so that one of the restriction members 25 with the appropriate projection amount is employed depending on positional accuracy of the drive shaft 24. As a result, a clearance between a projection surface of the restriction member 45 and the inner periphery of the ring gear 21 may be appropriately specified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve opening and closing timing control apparatus comprising:
   a driving-side rotation member arranged to be rotatable about a rotation axis and rotating synchronously with a crankshaft of an internal combustion engine;
   a driven-side rotation member arranged to be rotatable about the rotation axis and rotating integrally with a camshaft for opening and closing a valve of the internal combustion engine in a state where the driven-side rotation member is rotatable relative to the driving-side rotation member;
   a phase adjustment mechanism specifying a relative rotation phase between the driving-side rotation member and the driven-side rotation member by a drive force of an electric actuator;
   the phase adjustment mechanism including a ring gear, an inner gear and a drive shaft, the ring gear being arranged coaxially with the rotation axis and including an internal teeth portion, the inner gear being arranged coaxially with an eccentric axis which is disposed parallel to the rotation axis and including an external teeth portion which is meshed with a part of the internal teeth portion of the ring gear, the drive shaft being fitted in the inner gear and being coaxial with the rotation axis, the phase adjustment mechanism being configured as a differential type reduction gear mechanism where the inner gear rotates about the rotation axis while revolving around the eccentric axis in a state where the drive shaft is driven to rotate about the rotation axis by a drive force of the electric actuator,
   a biasing member provided at an outer periphery of the drive shaft, the biasing member applying a biasing force to mesh the external teeth portion of the inner gear with the internal teeth portion of the ring gear; and
   a restriction portion provided at the drive shaft to restrict a displacement of the inner gear in a direction where the inner gear is separated from the ring gear against the biasing force of the biasing member, wherein
   the drive shaft includes an eccentric surface which is defined with reference to the eccentric axis and at which a recess portion is provided, the recess portion to which a spring serving as the biasing member is fitted, and
   the restriction portion is constituted by at least one of opposed outer edge portions of the recess portion in a circumferential direction of the eccentric surface, the at least one of opposed outer edge portions protruding outward in a radial direction.

2. The valve opening and closing timing control apparatus according to claim 1, wherein the inner gear is supported at the eccentric surface via a bearing including an inner peripheral surface to which the biasing force is applied by the biasing member, the restriction portion being configured to make contact with the inner peripheral surface of the bearing to restrict a displacement of the inner gear.

3. The valve opening and closing timing control apparatus according to claim 1, wherein the restriction portion is constituted by a restriction member supported at the outer periphery of the drive shaft.

* * * * *